Jan. 2, 1951          P. ORZEL          2,536,389
SHEAVE PULLEY AND DRUM
Filed April 11, 1946                    2 Sheets-Sheet 1
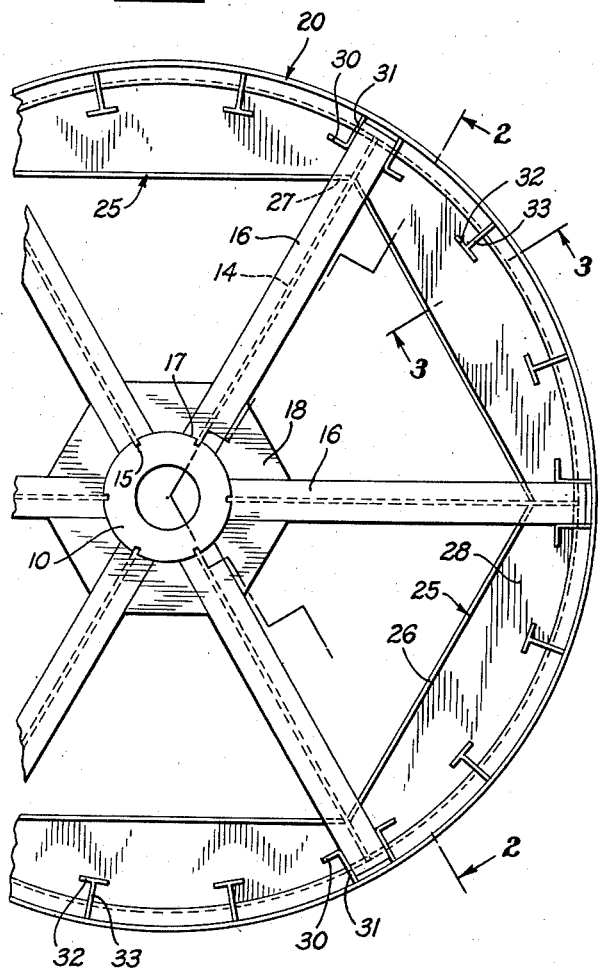
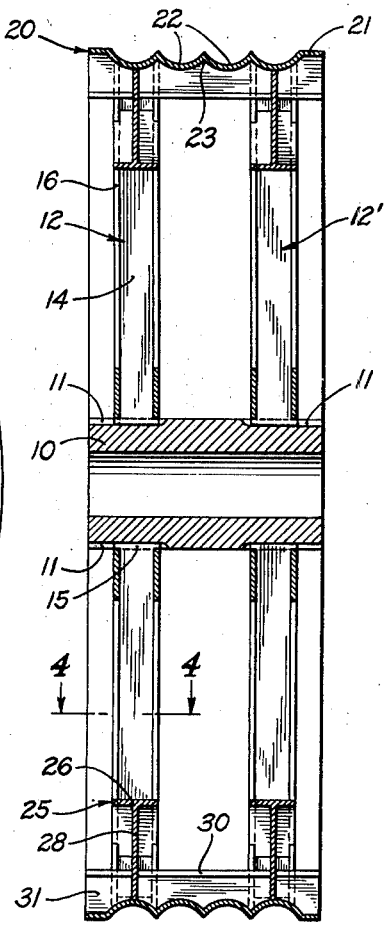
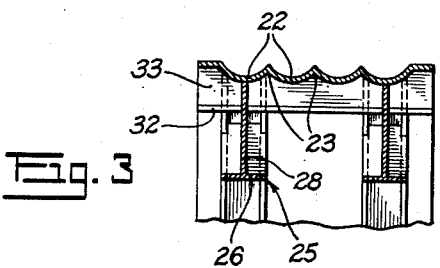
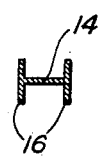
INVENTOR.
Paul Orzel
BY H. M. Kilpatrick
ATTORNEY Jan. 2, 1951     P. ORZEL     2,536,389
SHEAVE PULLEY AND DRUM
Filed April 11, 1946     2 Sheets-Sheet 2
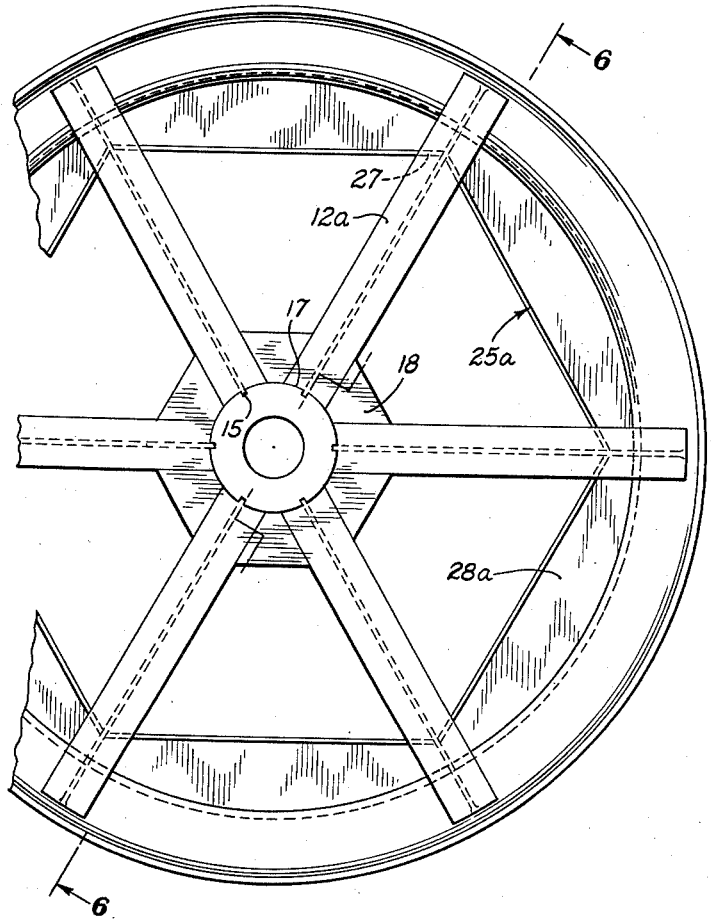
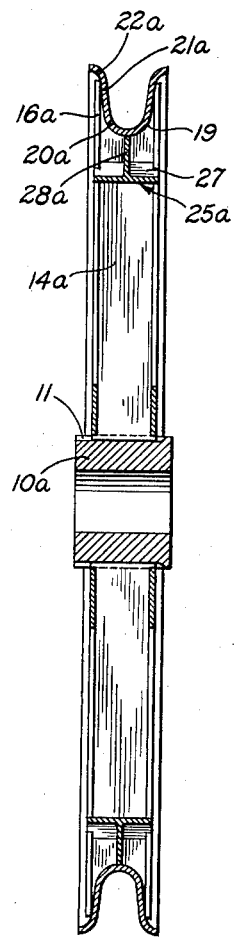
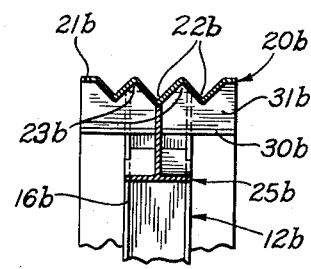
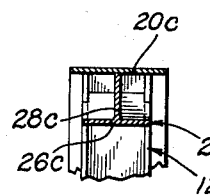
INVENTOR.
Paul Orzel
ATTORNEY Patented Jan. 2, 1951

2,536,389

UNITED STATES PATENT OFFICE 2,536,389

SHEAVE PULLEY AND DRUM

Paul Orzel, Bogota, N. J.

Application April 11, 1946, Serial No. 661,287

20 Claims. (Cl. 74—230.4)

This invention relates to pulleys, sheaves, drums and the like, and more particularly to such devices having cold rolled steel parts welded together; though it is noted that in many of the claims the invention is not limited to cold rolled steel or welding.

Objects of the invention are to provide an improved construction having a complete rope sheave rim, flat belt pulley rim, a V-belt pulley rim, or spiral grooved rope drum, together with spokes, a hub bearing, and connecting gussets of rolled steel sections precut and finished to permit easy assembly and welding without any further machining.

This prefabrication using an endless butt-jointed welded rim insures a concentric laterally aligned unit not obtainable by casting with its ever attending chance of core shifting.

In the case of rope sheave rim or spiral grooved rope drum, the sections may be formed by rolling or pressing thin sheet steel of sufficient carbon content to permit hardening simultaneously with the heating process of stress relieving of welds.

Other objects of the invention are to provide an improved means for reinforcing the rims against inward and lateral stresses, and to provide a construction permitting regular spacing of the spokes and to permit easy assembly of the precut parts.

Additional objects of the invention are to effect accuracy, simplicity and efficiency in devices and to provide an extremely simple device of this kind which is strong, durable, and reliable in operation, and economical to manufacture and assemble.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with several forms of the invention, each of which briefly stated, includes a hub having longitudinal grooves in its peripheral face, in which are received the webs of spokes comprising flanges and webs connecting the flanges, the inner ends of the webs being welded in said grooves, the inner ends of the flanges being fitted and welded around the hub. Strengthening gussets are fitted and welded on the hub and to and between the inner ends of adjacent spoke flanges. A rim is disposed around the spoke ends; and reinforcement trusses disposed between the outer ends of adjacent spokes have flanges spaced from the rim and welded to the spokes and a web welded to the spoke webs and engaging the inner face of the rim.

In the accompanying drawing, showing several of many possible embodiments of the invention, Fig. 1 is a fragmental side elevation showing one form of the invention;

Fig. 2 is a radial sectional view, partly in elevation taken on the line 2—2 of Fig. 1, looking in the direction of the arrows of said line;

Fig. 3 is a radial sectional view, partly in elevation, taken on the line 3—3 of Fig. 1, looking in the direction of the arrows of said line;

Fig. 4 shows a section on the line 4—4 of Fig. 2;

Fig. 5 is a fragmental side elevation showing another form of the invention;

Fig. 6 shows a section taken substantially on the line 6—6 of Fig. 5, looking in the direction of the arrows of said line; and Figs. 7 and 8 are fragmental radial sectional views, partly in elevation respectively showing parts of modified forms of the invention.

Figs. 1 to 4 show a rope pulley or spirally grooved rope drum comprising a hub 10 having sets of alined longitudinal milled grooves or seats 11 extending through the respective ends of the hub and terminating a short distance from the mid-part of the hub. A pair of identical series of radial spokes 12, 12' are mounted on the hub, the spokes 12 of one series being arranged side-by-side with the spokes 12a of the other series to form pairs of spokes, the respective spokes being of H-shaped cross-section.

The spoke webs 14 have their inner ends 15 fitted and welded in said grooves 11, the inner ends of the flanges 16 being rounded, as at 17, and fitted and welded around the peripheries of the hub at the ends of the grooves. If desired, metal strengthening gussets 18 are fitted and welded on the hub and to and between the edge faces of the inner ends of adjacent flanges 16 to stiffen the spokes.

An endless annular pulley or drum rim 20 of cold drawn steel is disposed circumferentially around the spoke ends to form an ungrooved margin 21 and parallel rounded circumferential grooves 22 on the outer face and complementary grooves 23 on the inner face. Arcuate bridging reinforcement bridges or trusses 25 of T-shaped cross-section are disposed between the outer ends of adjacent spokes of the same series and have their flanges 26 spaced from the rim 20; and the ends of the flanges 26 are welded to and between the spoke flanges 16 as at 27 (Fig. 1) and to the spoke web 14, the outer edge of the truss web 28 being formed to fit the inner face of the rim.

Transverse members or sections 30, 31 of L-shaped cross-section and sections or members 32, 33 T-shaped cross-section respectively are passed transversely through conforming openings cut in the truss web, the members being welded to the truss web and having flanges 30 and 32 spaced from the rim, the other flanges 31, 33 being contoured or scalloped to fit the inner face of the rim. The scalloped flanges 31 of the members of L-shaped cross-section are welded to flanges 16 of the spokes.

If the rim is to form a spiral-groove drum, the grooves 22 are spirally disposed on the rim; but if a wide grooved pulley is desired the grooves 22 are made endless.

The rope sheave of Fig. 6 comprises a hub 10a shorter than the hub 10 and having longitudinal milled grooves 11 extending through one end and terminating a short distance from the other end. The radial spokes 12a of H-shaped cross-section are fitted and welded in said grooves 11 as in Fig. 1, metal strengthening gussets 18 being provided also as in Fig. 1.

The outer ends of the spoke webs 14a are cut away to form U-shaped seats 19, the flanges 16a extending radially outwardly beyond the seats; and an endless annular sheave rim 20a of cold drawn steel of U-shaped cross section fitted and welded in said seats 19 has sides 21a engaging and welded to the inner faces of the extended flanges 16a and has outwardly turned edges 22a disposed over the ends of the flanges. The ends of the rim may be joined with a butt weld.

Arcuate bridging reinforcement trusses or bridges 25a of T-shaped cross-section disposed between the ends of adjacent spokes have the ends 27 of their flanges spaced from the rim and welded to and between the spoke flanges 16a and to the spoke webs 14a, the ends of the truss webs 28a being welded to the spoke webs 14a, the outer edges of the truss webs being formed to fit and welded to the inner face of the rim 20a.

In the form of the invention of Fig. 7 the inner ends of the single series of spokes 12b, the hub and the gussets 18 are as in Figs. 5 and 6; and a wide endless annular sheave pulley rim 20b of cold drawn steel is disposed around the spoke ends and drawn to form projecting margins 21b and parallel circumferential V-grooves 22b on the outer face and complementary grooves 23b on the inner face.

Arcuate bridging reinforcement trusses or bridges 25 of T-shaped cross-section are disposed and secured between the ends of adjacent spokes in engagement with the rim 20a, as in Figs. 1, 2, 5 and 6; transverse members of L-shaped 30b, 31b and T-shaped cross section (not shown similar to the members 32, 33 of Fig. 1) are passed transversely through and welded to the bridge web, the flanges 31 being spaced from the rim, the other flange 31b being notched to fit the inner face of the rim 20b. The notched flanges 31 of the members of L-shaped cross-section are welded to flanges 16b of the spokes. The ends of the rim may be joined with a butt weld, and the grooves 21b may be endless or spiral.

In the pulley of Fig. 8, the hub, gussets and inner ends of the spokes 12c may be as in Figs. 5 and 6.

A flat endless pulley rim 20c of cold drawn steel which may be welded at the ends with a butt weld is disposed circumferentially around and welded to the spoke ends; and arcuate bridging reinforcement trusses or bridges of T-shaped cross-section 20c are disposed between the ends of adjacent spokes and with their flanges 26c welded to the spoke flanges and webs, and their webs 28c welded to the spoke webs and the rim, as in Figs. 5 and 6.

In all forms of the invention the various parts may be precut and finished to permit assembly and welding without any further machining, and provide a concentric laterally aligned unit not obtainable by casting with its ever attending chance of core shifting.

In the case of rope sheave (Figs. 5 and 6) or spiral grooved rope drum (Figs. 1 and 2) the section may be formed by rolling or pressing thin sheet steel of sufficient carbon content to permit hardening simultaneously with the heating process of stress relieving of welds.

The bridging reinforcements (25, 25a, 25b, 25c) will permit the minimum number of spokes permitting an effective depth of rim section. This type of reinforcement is practically in proportional strength required for peripheral pressure, when considering the span of rim and spacing of spokes.

The members or sections 30, 31 and 32, 33 form transverse reinforcements of the rim and are welded to the rim and also to the bridging reinforcement trusses, whose webs are pierced by the respective sections permitting relatively thin metal rims.

The hubs 10 or 10a of tubular section with equally angular spaced milled slots 11 for the projected web ends of the spokes permits easy angular spacing of spokes for assembly, thereby locking all component members of the sheave pulley or drum in position for welding the completed unit.

A further advantage of welding the projected spoke web into the milled slot 11 of the hub is that it permits the spoke to transmit peripheral shear to hub to further aid in resisting this shear or torque. The gussets 18 between flanges of spokes further aid in resisting strains.

The invention claimed is:

1. In combination, a hub; widely regularly spaced spokes secured to the hub; a rim around and engaging the ends of the spokes; and reinforcement bridges secured to and between outer ends portions only of adjacent spokes and engaging the rim, said rim being continuous from side to side, said bridges extending from each spoke to the next and engaging substantially the entire inner circumference of the rim between the spokes.

2. In combination, a hub; spokes secured to the hub and having webs in planes radial to the hub and flanges joining the edges of the web; a rim around and engaging the ends of the spokes; and reinforcement bridges secured between outer ends of the flanges of adjacent spokes and engaging the rim, said rim being continuous from side to side, said bridges extending from each spoke to the next and engaging substantially the entire inner circumference of the rim between the spokes.

3. In combination, a hub having longitudinal milled grooves in the peripheral face thereof; radial spokes of H-shaped cross-section having the inner ends of their webs secured in said grooves, the inner ends of the flanges being rounded and fitted and welded around the peripheries of the hub at the ends of the grooves; an endless rim of cold drawn steel disposed circumferentially around and secured to the spoke ends; and arcuate bridging reinforcement trusses of T-shaped cross-section disposed between the ends of adjacent spokes and having its flanges spaced from the rim and welded to and between the spoke flanges and to the spoke web, the end of the truss web being welded to the spoke web, the outer edge of the truss web fitting the inner face of the rim.

4. In combination, a hub having longitudinal grooves in its peripheral face; spokes comprising flanges and webs connecting the flanges, the inner ends of the webs being secured in said grooves, the inner ends of the flanges being fitted and secured around the hub; and a rim around the ends of the spokes.

5. In combination, a hub having longitudinal grooves in its peripheral face; spokes comprising flanges and webs connecting the flanges, the inner ends of the webs being welded in said grooves, the inner ends of the flanges being fitted and welded around the hub; strengthening gussets fitted and welded on the hub and to and between the inner ends of adjacent flanges; and a rim disposed around the spoke ends.

6. In combination, a hub; spokes secured to the hub; a wide annular rim of sheet material disposed around the spoke ends; reinforcement bridges secured between outer ends of adjacent spokes and engaging the rim; and transverse members passed transversely through and secured to the bridges and engaging the inner face of the rim.

7. In combination, a hub; spokes of H-shaped cross-section secured to the hub with the spoke flanges transverse to the hub axis; an endless annular sheave pulley or drum rim of cold drawn steel disposed tangentially around the spoke ends and drawn to form parallel circumferential grooves on the outer face and complementary grooves on the inner face; arcuate bridging reinforcement trusses of T-shaped cross-section disposed between the ends of adjacent spokes having the ends of its flanges spaced from the rim and welded to and between the spoke flanges and to the spoke web the end of the truss web being welded to the spoke web, the outer edge of the truss web being cut to fit to inner face of the rim; transverse members of L-shaped and T-shaped cross section passed transversely through and welded to the bridge web and having flanges spaced from the rim, the other flange being shaped to fit the inner face of the rim, the shaped flanges of the members of L-shaped cross-section being welded to flanges of the spokes.

8. In combination, a hub; spokes secured to the hub; an endless annular rim of sheet material disposed around the spoke ends having parallel circumferential spiral grooves on the outer face and complementary grooves on the inner face; reinforcement bridges secured between outer ends of adjacent spokes and engaging the rim; and transverse members passed transversely through and secured to the bridges and formed to fit the inner face of the rim.

9. In combination, a hub; radial spokes of H-shaped cross section secured to the hub, the webs being in planes radial to the hub; an endless annular sheave pulley or drum rim of cold drawn steel disposed around the spoke ends of both series and drawn to form an ungrooved margin and parallel rounded circumferential grooves on the outer face of the rim and complementary grooves on the inner face; arcuate bridging reinforcement trusses of T-shaped cross-section disposed between the ends of adjacent spokes of the same series and having the ends of its flanges spaced from the rim and welded to and between the spoke flanges and to the spoke web, the truss web ends being welded to the spoke webs, the outer edge of the web being cut to fit the inner face of the rim; and transverse members of L-shaped and T-shaped cross section passed transversely through and welded to the bridge web and having flanges spaced from the rim, the other flange being scalloped to fit the inner face of the rim, the bridge web being provided with openings in which said members are received and fit; the scalloped flanges of the members of L-shaped cross-section being welded to flanges of the spokes.

10. In combination, a hub having alined longitudinal milled grooves extending through opposite ends and terminating a short distance from the mid-part of the hub; a pair of series of radial spokes, the spokes of one series being respectively arranged side-by-side with the spokes of the other series to form pairs of spokes, the respective spokes being of H-shaped cross-section and having webs having their inner ends fitted and welded in said grooves, the inner ends of the flanges being rounded and fitted and welded around the peripheries of the hub at the ends of the grooves; metal strengthening gussets fitted and welded on the hub and to and between the edge faces of the inner ends of adjacent flanges to stiffen the spokes; a rim around the ends of the spokes; means mounting the rim on the ends of the spokes; and reinforcement bridges secured between outer ends of adjacent spokes and engaging the inner face of the rim.

11. A sheave comprising a hub having longitudinal milled grooves extending through one end and terminating a short distance from the other end; radial spokes of H-shaped cross-section each having a web and a flange the inner ends of their web being fitted and welded in said grooves, the inner ends of the flanges being mounted and fitted and welded around the peripheries of the hub at the ends of the grooves; the outer ends of the web being cut away to form U-shaped seats, the flanges extending radially outwardly beyond the seats; an endless annular sheave rim of cold drawn steel U-shaped cross section fitted and welded in said seats and having sides engaging and welded to the inner faces of the extended flanges and having outwardly turned edges disposed over the ends of the flanges; the ends of the rim being joined with a butt weld; arcuate bridging reinforcement trusses of T-shaped cross-section disposed chordally between the ends of adjacent spokes each truss having the ends of its flanges spaced from the rim and welded to and between the spoke flanges and to the spoke web, the end of the truss web being welded to the spoke web, the outer edge of the truss web being cut to fit and welded to the inner face of the rim.

12. In combination a hub; spokes of H-shaped cross-section secured to the hub, the spoke webs being in planes radial to the hub; the outer ends of the webs being cut away to form U-shaped seats, the flanges extending radially outwardly beyond the seats; an endless annular sheave rim of cold drawn steel of U-shaped cross section fitted and welded in said seats and having sides engaging and welded to the inner faces of the extended flanges and having outwardly turned edges disposed over the ends of the flanges; arcuate bridging reinforcement trusses of T-shaped cross-section disposed between the ends of the adjacent spokes having the ends of its flanges spaced from the rim and welded to and between the spoke flanges and to the spoke web, the end of the truss webs being welded to the spoke webs, the outer edge of the truss web being formed to fit and welded to the inner face of the rim.

13. In combination, a hub having longitudinal milled grooves extending through one end and terminating a short distance from the other end; radial spokes of H-shaped cross-section having the inner ends of their web fitted and welded in said grooves, the inner ends of the flanges being rounded and fitted and welded around the peripheries of the hub at the ends of the grooves; a rim mounted around the ends of the spokes; and reinforcement bridges secured between outer ends of adjacent spokes and engaging the rim.

14. A sheave comprising a hub having longitudinal milled grooves extending through one end and terminating a short distance from the other end; radial spokes of H-shaped cross-section having the inner ends of their webs fitted and welded in said grooves, the inner ends of the flanges being rounded and fitted and welded around the peripheries of the hub at the ends of the grooves; metal strengthening gussets fitted and welded on the hub and to and between the edge faces of the inner ends of adjacent flanges to stiffen the spokes; a flat endless pulley rim of cold drawn steel welded at the ends with a butt weld and disposed tangentially around and welded to the spoke ends; and arcuate bridging reinforcement trusses of T-shaped cross-section disposed between the ends of adjacent spokes and having the ends of its flanges spaced from the rim and welded to and between the spoke flanges and to the spoke web, the end of the truss web being welded to the spoke web, the outer end of the truss web fitting the inner face of the rim.

15. In combination; a hub having longitudinal grooves in its periphery; spokes of angular cross-section, each comprising a web and a flange, inner ends of the webs being projected beyond the flanges and fitted in said grooves, the inner ends of the flanges being rounded and secured around the periphery of the hub; and a rim around the ends of the spokes.

16. In combination; a hub having longitudinal grooves in its periphery; spokes of H-shaped cross-section each comprising a web and flanges, the inner ends of the webs being fitted in said grooves, the inner ends of the flanges being rounded and fitted around the periphery of the hub; and a rim around the ends of the spokes.

17. A combination comprising a hub; spokes secured to the hub and having widely spaced outer ends; a rim of thin material around and engaging the outer ends of the spokes; and reinforcement bridges secured to and between outer end portions of adjacent spokes at said outer end portions only and supporting and engaging the rim said rim being continuous from side to side, said bridges extending from each spoke to the next and engaging substantially the entire inner circumference of the rim between the spokes.

18. A combination comprising a hub; spokes secured to the hub and having widely spaced outer ends; a rim of thin material around and engaging the outer ends of the spokes; and reinforcement bridges secured to and between outer end portions of adjacent spokes at said outer end portions only and supporting and engaging the rim; the transverse section of the bridge being elongated in a direction toward the hub said rim being continuous from side to side, said bridges extending from each spoke to the next and engaging substantially the entire inner circumference of the rim between the spokes.

19. A combination comprising a hub; spokes of H-shaped cross section secured to the hub and having widely spaced outer ends; a rim around and engaging the outer ends of the spokes; and reinforcement bridges in its ends secured to and between outer end portions only of the flanges of adjacent spokes and engaging and supporting the rim said rim being continuous from side to side, said bridges extending from each spoke to the next and engaging substantially the entire inner circumference of the rim between the spokes.

20. A combination comprising a hub; spokes of H-shaped cross section secured to the hub and having widely spaced outer ends; a rim of thin material around and engaging the outer ends of the spokes; the ends of the webs of the spokes being transverse to the rim; and reinforcement bridges secured to and between outer end portions of adjacent spokes at said outer end portions only and supporting and engaging the rim; the ends of the bridges being secured to the webs and secured beween flanges of the adjacent spokes said rim being continuous from side to side, said bridges extending from each spoke to the next and engaging substantially the entire inner circumference of the rim between the spokes.

PAUL ORZEL.

REFERENCES CITED

The following references are of record in the file of this patent:

UNITED STATES PATENTS

| Number | Name | Date |
|---|---|---|
| 1,159,555 | Venske | Nov. 9, 1915 |
| 1,200,762 | Santrock | Oct. 10, 1916 |
| 1,212,803 | Murray | Jan. 16, 1917 |
| 1,427,025 | Schafly | Aug. 22, 1922 |
| 1,638,702 | O'Brien | Aug. 9, 1927 |

FOREIGN PATENTS

| Number | Country | Date |
|---|---|---|
| 3,077 | Great Britain | 1913 |